United States Patent
Iwata et al.

(10) Patent No.: US 12,508,986 B2
(45) Date of Patent: Dec. 30, 2025

(54) VEHICLE REST EVALUATION DEVICE

(71) Applicant: SUBARU CORPORATION, Tokyo (JP)

(72) Inventors: Satoru Iwata, Tokyo (JP); Shohei Nishio, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 87 days.

(21) Appl. No.: 18/415,768

(22) Filed: Jan. 18, 2024

(65) Prior Publication Data

US 2024/0270162 A1 Aug. 15, 2024

(30) Foreign Application Priority Data

Feb. 13, 2023 (JP) ................. 2023-019739

(51) Int. Cl.
  *B60Q 9/00* (2006.01)
  *A61B 5/00* (2006.01)
  *A61B 5/16* (2006.01)
(52) U.S. Cl.
  CPC .............. *B60Q 9/00* (2013.01); *A61B 5/4035* (2013.01); *A61B 5/165* (2013.01)
(58) Field of Classification Search
  CPC .......... B60Q 9/00; A61B 5/4035; A61B 5/165
  USPC ...................................................... 340/425.5
  See application file for complete search history.

(56) References Cited

U.S. PATENT DOCUMENTS

| | | | | |
|---|---|---|---|---|
| 9,103,688 B2* | 8/2015 | Pivonka | ............. | G01C 21/3484 |
| 9,994,228 B2* | 6/2018 | Krueger | ............. | A61B 5/02055 |
| 2009/0036755 A1* | 2/2009 | Pradeep | .................. | A61B 3/113 |
| | | | | 600/301 |
| 2009/0221928 A1* | 9/2009 | Einav | ................... | A61B 5/4076 |
| | | | | 601/5 |
| 2010/0036267 A1* | 2/2010 | Liao | ...................... | A61B 5/6838 |
| | | | | 600/500 |
| 2011/0046473 A1* | 2/2011 | Pradeep | .................. | A61B 5/16 |
| | | | | 600/413 |
| 2013/0226408 A1* | 8/2013 | Fung | ....................... | G08G 1/166 |
| | | | | 701/1 |
| 2014/0371603 A1* | 12/2014 | Fujita | ...................... | A61B 5/18 |
| | | | | 600/479 |
| 2020/0054263 A1* | 2/2020 | Yamada | .................. | A61B 5/022 |
| 2020/0196862 A1* | 6/2020 | Wilson | ................... | A61B 3/102 |
| 2020/0286505 A1* | 9/2020 | Osborne | ............. | G10H 1/0025 |

(Continued)

FOREIGN PATENT DOCUMENTS

JP 2009-208727 A 9/2009

*Primary Examiner* — Zhen Y Wu
(74) *Attorney, Agent, or Firm* — TROUTMAN PEPPER LOCKE LLP

(57) ABSTRACT

A vehicle rest evaluation device for a vehicle includes a computer. The computer includes a biological information acquirer, an evaluation value calculator, and a notification controller. The biological information acquirer is configured to acquire biological information of a user who rests in the vehicle. The evaluation value calculator is configured to calculate, based on the biological information, an evaluation value for evaluating a balance of an autonomic nervous system of the user. The notification controller is configured to make a comparison between a first evaluation value calculated by the evaluation value calculator and a second evaluation value calculated at a different timing from the first evaluation value and notify the user of a result of the comparison.

16 Claims, 7 Drawing Sheets

(56) References Cited

U.S. PATENT DOCUMENTS

2020/0359908 A1\* 11/2020 Wei ..................... A61B 5/021
2020/0387758 A1\* 12/2020 Kobayashi ............ G06F 18/217

\* cited by examiner

FIG. 3

| SYMPATHETIC NERVOUS SYSTEM DOMINANCE (TENSE/EXCITED) | | PARASYMPATHETIC NERVOUS SYSTEM DOMINANCE (RELAXED) |
|---|---|---|
| CONSTRICTION | BLOOD VESSELS | RELAXING |
| INCREASE | BLOOD PRESSURE | DECREASE |
| FAST | HEARTBEAT | SLOW |
| FAST | RESPIRATION | SLOW |
| TENSE | MUSCLES | RELAXING |
| INCREASE | BODY TEMPERATURE | DECREASE |
| INHIBITION OF PERISTALSIS | INTESTINES (FOR DIGESTION) | STIMULATION OF PERISTALSIS |
| STIMULATED | SWEATING | INHIBITED |

FIG. 4

| IMAGE PROCESSING | BIOLOGICAL INFORMATION |
|---|---|
| FACE COLOR | DEGREE OF VASCULAR RELAXATION |
| PUPIL DIAMETER | DEGREE OF DECREASE IN BLOOD PRESSURE |
| SKIN COLOR | HEART RATE, LF/HF RATIO |
| SHOULDER OR CHEST MOVEMENT | RESPIRATORY RATE |
| POSITIONS OF FACIAL FEATURE POINTS | DEGREE OF MUSCLE RELAXATION |
| BODY TEMPERATURE | BODY TEMPERATURE |

 COEFFICIENT

| EVALUATION ITEMS |
|---|
| DEGREE OF VASCULAR RELAXATION |
| HEART RATE VARIABILITY |
| HEART RATE FREQUENCY |
| RESPIRATORY RATE |
| AMOUNT OF MUSCLE MOVEMENT |
| DECREASE IN BODY TEMPERATURE |

VEHICLE REST EVALUATION DEVICE

CROSS-REFERENCE TO RELATED APPLICATION

The present application claims priority from Japanese Patent Application No. 2023-019739 filed on Feb. 13, 2023, the entire contents of which are hereby incorporated by reference.

BACKGROUND

The disclosure relates to a technical field of vehicle rest evaluation devices.

In the related art, a system for a vehicle has been proposed. The system acquires biological characteristic information of a user in the vehicle, specifies a mental state of the user on the basis of the content of the acquired biological characteristic information, and performs a fragrance generation operation, an air conditioning operation, and a sound output operation on the basis of the specified mental state (for example, see Japanese Unexamined Patent Application Publication No. 2009-208727).

SUMMARY

An aspect of the disclosure provides a vehicle rest evaluation device for a vehicle including a computer. The computer includes a biological information acquirer, an evaluation value calculator, and a notification controller. The biological information acquirer is configured to acquire biological information of a user who rests in the vehicle. The evaluation value calculator is configured to calculate, based on the biological information, a first evaluation value and a second evaluation value for evaluating a balance of an autonomic nervous system of the user. The notification controller is configured to make a comparison between the first evaluation value calculated by the evaluation value calculator at a first timing and the second evaluation value calculated by the evaluation value calculator at a second timing different from the first timing, and to notify the user of a result of the comparison.

An aspect of the disclosure provides a vehicle rest evaluation device for a vehicle including circuitry. The circuitry is configured to acquire biological information of a user who rests in the vehicle. The circuitry is configured to calculate, based on the biological information, a first evaluation value and a second evaluation value for evaluating a balance of an autonomic nervous system of the user. The circuitry is configured to make a comparison between the first evaluation value calculated by the evaluation value calculator at a first timing and the second evaluation value calculated by the evaluation value calculator at a second timing different from the first timing. The circuitry is configured to notify the user of a result of the comparison.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a diagram illustrating the relationship between the sympathetic nervous system and the parasympathetic nervous system;

FIG. 4 is a diagram illustrating evaluation items for evaluating the quality of rest taken by a user;

DETAILED DESCRIPTION

For example, a driver of a vehicle may take a rest in the vehicle while driving for a long period of time or while charging a battery of the vehicle when the vehicle is an electric vehicle or a hybrid vehicle. Since a rest in the vehicle is often a short break, it is desired to make the driver take a good quality rest in a short time.

It is therefore desirable to improve the quality of rest taken in a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
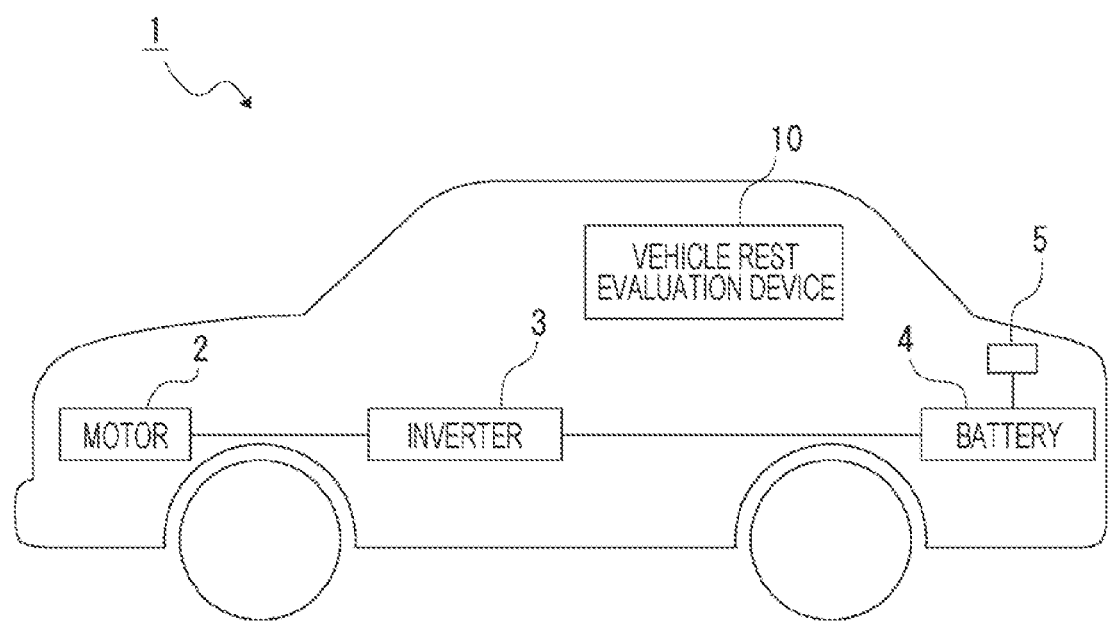
FIG. 1 is a diagram illustrating a schematic configuration of a vehicle.

FIG. 1 is a diagram illustrating a schematic configuration of a vehicle 1 according to the embodiment. As illustrated in FIG. 1, the vehicle 1 is a plug-in electric vehicle or hybrid vehicle including a motor 2, an inverter 3, a battery 4, and a charging plug 5.

The motor 2 is a power source that allows the vehicle 1 to travel. Examples of the motor 2 include a three-phase alternating current (AC) motor. The motor 2 generates a driving force upon being supplied with electric power from the battery 4 via the inverter 3, and transmits the driving force to driving wheels to allow the vehicle 1 to travel. When the vehicle 1 is a hybrid vehicle, the vehicle 1 also includes an engine as a power source.

The motor 2 performs a regenerative operation to generate electricity (electric power). The electricity generated by the regenerative operation of the motor 2 is supplied to the battery 4 via the inverter 3.

The inverter 3 converts a direct current (DC) current supplied from the battery 4 into a three-phase AC current and supplies the three-phase AC current to the motor 2. When the motor 2 performs a regenerative operation, the inverter 3 converts an AC current supplied from the motor 2 into a DC current and supplies the DC current to the battery 4.

The battery 4 is a so-called high-voltage secondary battery and stores electricity to be supplied to the motor 2. The battery 4 can be charged by the regenerative operation of the motor 2. The battery 4 can also be charged with electricity supplied from an external device via a charging gun or the like inserted into the charging plug 5.

The vehicle 1 further includes a vehicle rest evaluation device 10 for making a comparison between evaluation values for rest taken by a user (for example, a driver) and notifying the user of a result of the comparison. The vehicle rest evaluation device 10 will be mainly described hereinafter.

Figure 2:
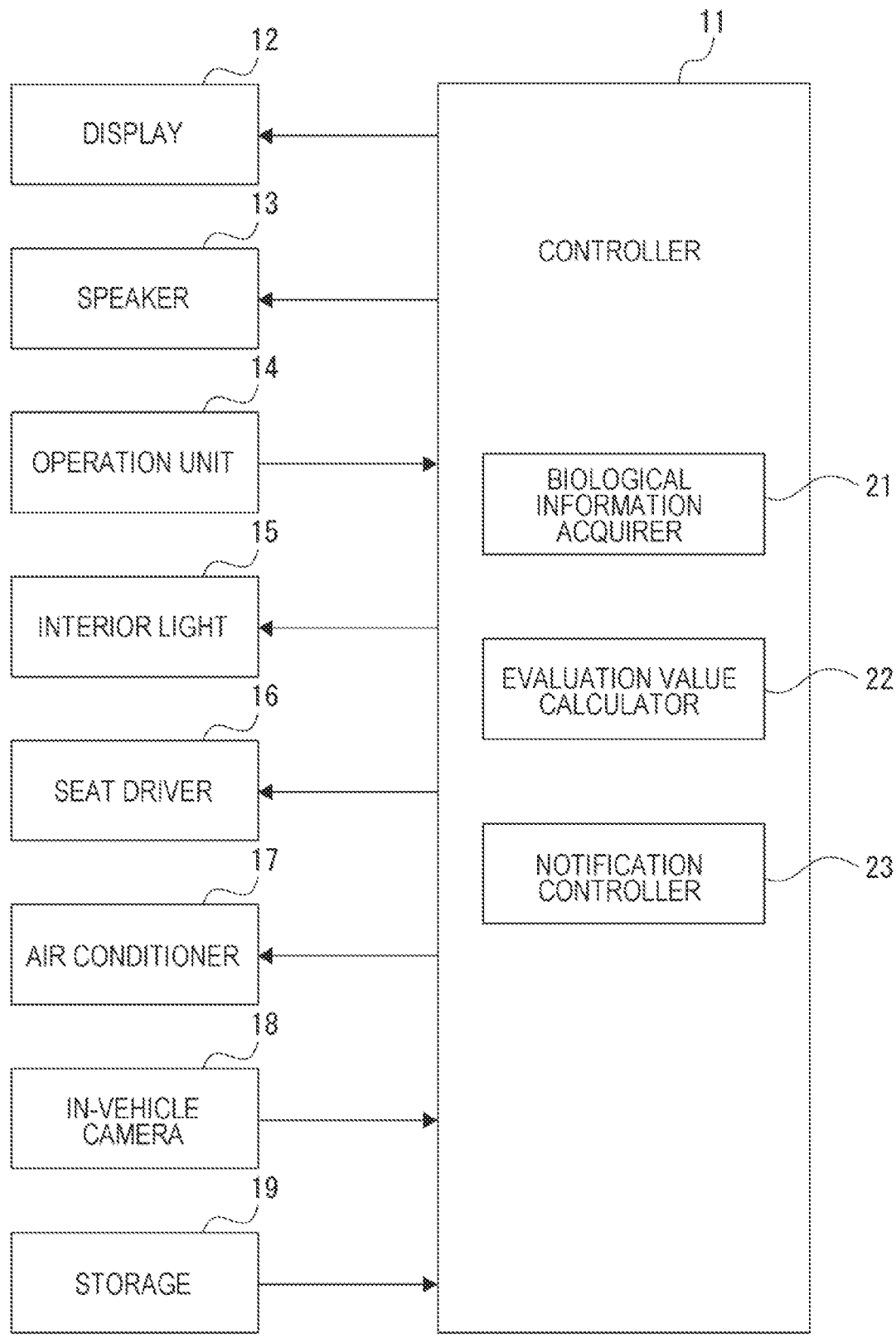
FIG. 2 is a diagram illustrating a configuration of a vehicle rest evaluation device.

FIG. 2 is a diagram illustrating a configuration of the vehicle rest evaluation device 10. As illustrated in FIG. 2, the vehicle rest evaluation device 10 includes a controller 11, a display 12, a speaker 13, an operation unit 14, an interior light 15, a seat driver 16, an air conditioner 17, an in-vehicle camera 18, and a storage 19.

The controller 11 is configured by a computer such as an electronic control unit (ECU), and performs overall control of the vehicle rest evaluation device 10. In the present embodiment, the controller 11 serves as a biological information acquirer 21, an evaluation value calculator 22, and a notification controller 23.

The biological information acquirer 21 acquires biological information of a user who rests in the vehicle 1.

The evaluation value calculator 22 calculates an evaluation value for evaluating the balance of the autonomic nervous system of the user on the basis of the biological information.

The notification controller 23 makes a comparison between the evaluation value calculated by the evaluation value calculator 22 and an evaluation value calculated at a different timing and notifies the user of a result of the comparison.

The biological information acquirer 21, the evaluation value calculator 22, and the notification controller 23 will be described in detail below.

The display 12 is a liquid crystal display or an organic electroluminescent (EL) display. The display 12 displays various images (or screens) under the control of the controller 11. The display 12 may be a center display provided in a navigation device or the like, or may be a multi-information display disposed in front of a driver's seat.

The speaker 13 outputs various sounds (such as music and voices) under the control of the controller 11.

The operation unit 14 includes a button, a dial, a touch panel, and the like, and receives the user's operation. Upon receiving the user's operation, the operation unit 14 outputs a signal corresponding to the operation to the controller 11.

The interior light 15 is, for example, a light emitting diode (LED) disposed inside the vehicle 1 (i.e., the vehicle cabin). The brightness and color of the interior light 15 can be adjusted. The interior light 15 irradiates the inside of the vehicle 1 with light having a color and brightness based on the control of the controller 11.

The seat driver 16 moves, for example, the driver's seat under the control of the controller 11. In one example, the seat driver 16 reclines or raises the backrest.

The air conditioner 17 adjusts the temperature in the vehicle 1 under the control of the controller 11.

The in-vehicle camera 18 is a camera that mainly captures an image of the face or the upper body of the driver seated on the driver's seat. The image captured by the in-vehicle camera 18 is output to the controller 11.

The storage 19 is a nonvolatile memory such as a hard disk drive (HDD) or a flash memory, and stores various types of information (data). The storage 19 may store a program to be executed by the controller 11.

The rest evaluation process performed by the vehicle rest evaluation device 10 will be described hereinafter. In one example, the rest evaluation process is performed for the driver as the user. In another example, the user may be an occupant other than the driver.

When the battery 4 of the vehicle 1 is charged with electric power supplied from an external device, the charging time may take about 30 minutes to 60 minutes, for example. The charging time is not a concern when the battery 4 is charged at home. However, when the battery 4 is charged away from home, the user may sit on the driver's seat and take a rest during the charging time.

The user may also sit on the driver's seat and take a rest for a certain period of time during a time other than the charging time of the battery 4, such as when the user is tired or feels sleepy during long-term driving.

When the user takes a rest in this way for a short time determined to some extent, the vehicle rest evaluation device 10 executes the rest evaluation process to evaluate the quality of the rest.

In one example, the controller 11 starts the rest evaluation process when a predetermined start condition is satisfied. Examples of the start condition include a condition that an operation for starting the rest evaluation process via the operation unit 14 is received from the user after the charging gun is inserted into the charging plug 5 and the supply of electric power from the external device is started.

However, the start condition is not limited to this condition. Any other start condition may be used if it can be determined that the vehicle 1 is at a stop for a certain period of time and the user starts to take a rest.

When the rest evaluation process is started, the controller 11 performs the setting of a rest time and various functions. The various functions include, for example, output of a sound, emission of light, and display of an image. Examples of the setting of the various functions include switching between on and off of output of a sound, emission of light, and display of an image, determining the volume of the sound, adjusting the brightness and color of light, and determining the type of the image.

In one example, the controller 11 causes the display 12 to display a screen for setting the rest time and various functions, and prompts the user to input the settings of the rest time and various functions via the operation unit 14.

During the charging period of the battery 4, the controller 11 may calculate the time taken to complete charging of the battery 4, based on the state of charge (SOC) of the battery 4 or the supplied electric power, and set the calculated time as the rest time.

Further, the controller 11 may perform the setting of various functions by reading the settings set for the user in advance from the storage 19.

When the start condition is satisfied and the setting of the rest time and various functions is performed, the controller 11 performs relaxation setting to help the user take a rest.

In the relaxation setting, the controller 11 drives the seat driver 16 to recline the driver's seat.

Further, the controller 11 causes the display 12 to display a preset image or an image that is set at the start of the rest evaluation process.

Further, the controller 11 causes the speaker 13 to output a preset sound or a sound that is set at the start of the rest evaluation process.

Further, the controller 11 causes the interior light 15 to emit light based on a preset brightness and color or a brightness and color that is set at the start of the rest evaluation process.

Further, the controller 11 controls the air conditioner 17 to set a temperature to make the user feel comfortable, based on the biological information of the user (such as the user's body temperature and degree of vasoconstriction, for example), which will be described in detail below.

During the rest evaluation process, the controller 11 appropriately updates the relaxation setting to improve the quality of rest taken by the user (or to make the user more relaxed).

The biological information acquirer 21 acquires an image captured by the in-vehicle camera 18 during the rest evaluation process. The image captured by the in-vehicle camera 18 may be a still image or a moving image. When the image captured by the in-vehicle camera 18 is a still image, the biological information acquirer 21 acquires still images from the in-vehicle camera 18 at predetermined intervals. When the image captured by the in-vehicle camera 18 is a moving image, the biological information acquirer 21 acquires frame images constituting a moving image from the in-vehicle camera 18 at any time.

The image captured by the in-vehicle camera 18 shows the face and the upper body of the user. The biological information acquirer 21 performs image processing on the acquired image to acquire biological information of the user. The biological information may be calculated each time an image is acquired, or may be calculated each time a predetermined number of images are acquired.

FIG. 3 is a diagram illustrating the relationship between the sympathetic nervous system and the parasympathetic nervous system. FIG. 4 is a diagram illustrating evaluation items for evaluating the quality of rest taken by the user.

The autonomic nervous system includes the sympathetic nervous system and the parasympathetic nervous system. A person is relaxed when the parasympathetic nervous system is dominant, and is tense and excited when the sympathetic nervous system is dominant.

As illustrated in FIG. 3, blood vessels constrict when the sympathetic nervous system is dominant, and relax when the parasympathetic nervous system is dominant. The blood pressure increases when the sympathetic nervous system is more dominant, and decreases when the parasympathetic nervous system is more dominant. The heartbeat becomes fast when the sympathetic nervous system is more dominant, and becomes slow when the parasympathetic nervous system is more dominant. The respiration becomes fast when the sympathetic nervous system is more dominant, and becomes slow when the parasympathetic nervous system is more dominant. Muscles tense when the sympathetic nervous system is dominant, and relax when the parasympathetic nervous system is dominant. The body temperature increases when the sympathetic nervous system is dominant, and decreases when the parasympathetic nervous system is dominant. In the intestines (for digestion), peristalsis is inhibited when the sympathetic nervous system is dominant, and is stimulated when the parasympathetic nervous system is dominant. Sweating is stimulated when the sympathetic nervous system is dominant, and is inhibited when the parasympathetic nervous system is dominant.

Accordingly, the vehicle rest evaluation device 10 acquires information about the blood vessels, the blood pressure, the heartbeat, the respiration, the muscles, the body temperature, the intestines (for digestion), and the sweating as biological information, and thus can determine the degree to which the user is relaxed (the degree of dominance of the parasympathetic nervous system).

In the present embodiment, the biological information acquirer 21 performs image processing on an image captured by the in-vehicle camera 18 to acquire biological information related to the blood vessels, the blood pressure, the heartbeat, the respiration, the muscles, and the body temperature.

When the blood vessels relax (widen), blood flow increases and the skin appears reddish. Accordingly, as illustrated in FIG. 4, the biological information acquirer 21 performs image processing on the image captured by the in-vehicle camera 18 to detect the face color (the complexion of the cheeks and forehead). Then, the biological information acquirer 21 compares the detected face color with a predetermined comparison target color to calculate the degree of vascular relaxation (the degree of redness on the skin) as the information about the blood vessels.

The comparison target color may be the user's face color acquired under normal conditions (when the user is neither tense nor relaxed), or may be the user's face color acquired at the start of the rest evaluation process.

When the blood pressure increases, the pupil diameter increases. When the blood pressure decreases, the pupil diameter decreases. Accordingly, the biological information acquirer 21 performs image processing on the image captured by the in-vehicle camera 18 to detect the pupil diameter. Then, the biological information acquirer 21 compares the detected pupil diameter with a predetermined comparison target pupil diameter to calculate the degree of decrease in blood pressure (the degree of reduction in pupil diameter) as the information about the blood pressure.

The comparison target pupil diameter may be the user's pupil diameter acquired under normal conditions (when the user is neither tense nor relaxed), or may be the user's pupil diameter acquired at the start of the rest evaluation process.

It is known that the heart rate can be calculated based on a change in skin color over time. Accordingly, the biological information acquirer 21 performs image processing on the image captured by the in-vehicle camera 18 to detect the skin color (the color of the veins). Then, the biological information acquirer 21 calculates the heart rate as the information about the heartbeat, based on the detected change in skin color over time.

The biological information acquirer 21 further calculates a high-frequency fluctuation component (HF) and a low-frequency component (LF) on the basis of the detected change in skin color over time, and then calculates an LF/HF ratio as the information about the heartbeat.

It is known that the respiratory rate can be calculated based on a change in shoulder or chest movement over time. Accordingly, the biological information acquirer 21 performs image processing on the image captured by the in-vehicle camera 18 to detect shoulder or chest movement. Then, the biological information acquirer 21 calculates the respiratory rate as the information about the respiration, based on the detected change in shoulder or chest movement over time.

It is known that the degree of muscle relaxation can be detected by using the degree of stiffness in facial muscles or the degree of eyebrow raising. Accordingly, the biological information acquirer 21 performs image processing on the image captured by the in-vehicle camera 18 to detect the positions of facial feature points (such as lip corners and eyebrow corners). Then, the biological information acquirer 21 compares the detected positions of the facial feature points with the positions of predetermined comparison target facial feature points to calculate the degree of muscle relaxation as the information about the muscles.

The positions of the comparison target facial feature points may be the positions of the user's facial feature points acquired under normal conditions (when the user is neither tense nor relaxed), or may be the positions of the user's facial feature points acquired at the start of the rest evaluation process.

In a case where the in-vehicle camera 18 is capable of acquiring an infrared image (in a case where the in-vehicle camera 18 includes a thermal camera), the biological information acquirer 21 performs image processing on the image captured by the in-vehicle camera 18 to detect the body temperature of the user as the information about the body temperature.

The method of performing image processing to detect or calculate the biological information described above is feasible using a known method, and thus a description thereof will be omitted.

The biological information is not limited to the eight items described above, and other information may be used if the balance of the autonomic nervous system can be determined. The biological information acquirer 21 may acquire any number of pieces of biological information among the six pieces of biological information described above as long as the biological information acquirer 21 acquires one or more of the six pieces of biological information described above. Alternatively, the biological information acquirer 21 may acquire biological information other than the six pieces of biological information described above.

When the rest time ends, the evaluation value calculator 22 calculates, based on the biological information acquired so far, evaluation values for multiple evaluation items. The evaluation values are for determining the balance of the autonomic nervous system of the user. For this reason, the evaluation values may also be referred to as values for evaluating the quality of rest taken by the user.

As illustrated in FIG. 4, the evaluation items for evaluating the quality of rest taken by the user include the degree of relaxation, the heart rate variability, the heart rate frequency (LF/HF ratio), the respiratory rate, the amount of muscle movement, and the decrease in body temperature.

The degree of relaxation represents how much the blood vessels of the user relax.

The heart rate variability represents how much the heart rate varies.

The heart rate frequency represents the ratio of the low-frequency component (LF component) to the high-frequency fluctuation component (HF component).

The respiratory rate represents the number of breaths the user takes.

The amount of muscle movement represents how much the user's muscles are moving.

The decrease in body temperature represents how much the body temperature of the user has decreased.

Other evaluation items may be used if the balance of the autonomic nervous system of the user can be determined. The evaluation value calculator 22 may calculate any number of evaluation values among the evaluation values for the items described above as long as the evaluation value calculator 22 calculates at least one or more of the evaluation values for the items described above.

The evaluation value calculator 22 multiplies, for each of the evaluation items, one or more of the pieces of biological information acquired by the biological information acquirer 21 by a predetermined coefficient to calculate an evaluation value. The respective evaluation values for the evaluation items are calculated such that the evaluation value for each of the evaluation items increases as the parasympathetic nervous system is more dominant, that is, as the degree to which the user is relaxed increases. Each of the evaluation values may be calculated as a relative value for each individual by, for example, calculating the ratio of the biological information acquired in the current rest to the biological information acquired in a previous rest.

For example, when calculating the evaluation value for the degree of vascular relaxation, the evaluation value calculator 22 multiplies the degree of vascular relaxation and the degree of decrease in blood pressure, which are acquired by the biological information acquirer 21, by respective predetermined coefficients and adds the results together to calculate the evaluation value for the degree of relaxation.

When calculating the evaluation value for the heart rate variability, the evaluation value calculator 22 multiplies the variability of the heart rate over a predetermined period, which is acquired by the biological information acquirer 21, by a predetermined coefficient to calculate the evaluation value for the heart rate variability.

When calculating the evaluation value for the heart rate frequency, the evaluation value calculator 22 multiplies the LF/HF ratio, which is acquired by the biological information acquirer 21, by a predetermined coefficient to calculate the evaluation value for the heart rate frequency.

When calculating the evaluation value for the respiratory rate, the evaluation value calculator 22 multiplies the respiratory rate, which is acquired by the biological information acquirer 21, by a predetermined coefficient to calculate the evaluation value for the respiratory rate.

When calculating the evaluation value for the amount of muscle movement, the evaluation value calculator 22 multiplies the degree of muscle relaxation, which is acquired by the biological information acquirer 21, by a predetermined coefficient to calculate the evaluation value for the amount of muscle movement.

When calculating the evaluation value for the decrease in body temperature, the evaluation value calculator 22 multiplies the decrease in body temperature over a predetermined period, which is acquired by the biological information acquirer 21, by a predetermined coefficient to calculate the evaluation value for the decrease in body temperature.

Figure 5:
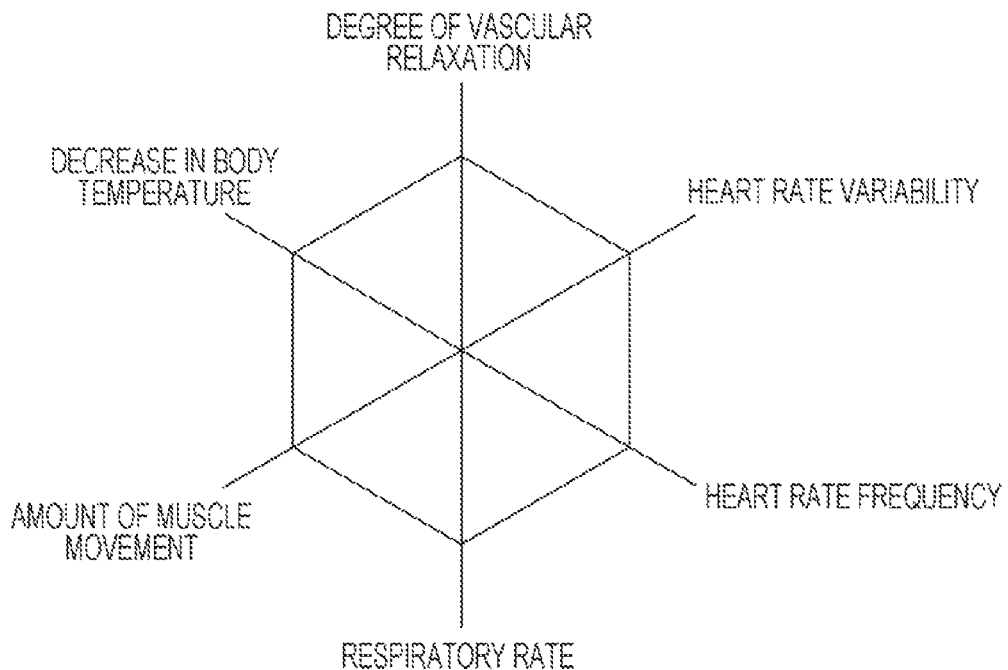
FIG. 5 is a diagram illustrating a radar chart to provide notification of evaluation values.

FIG. 5 is a diagram illustrating a radar chart to provide notification of evaluation values. When the rest time elapses, the notification controller 23 plots the evaluation values for the six evaluation items calculated by the evaluation value calculator 22 on a hexagonal radar chart illustrated in FIG. 5 and displays the radar chart on the display 12 to notify the user of the respective evaluation values for the evaluation items during the rest time, that is, the quality of rest taken by the user. In the radar chart, the larger the area of the hexagon, the better the quality of rest (i.e., the more relaxed the user is).

The notification controller 23 compares the evaluation values calculated by the evaluation value calculator 22 with the evaluation values calculated at a different timing and notifies the user of the comparison result. This allows the user to easily check and understand the quality of rest currently taken by the user.

Figure 6:
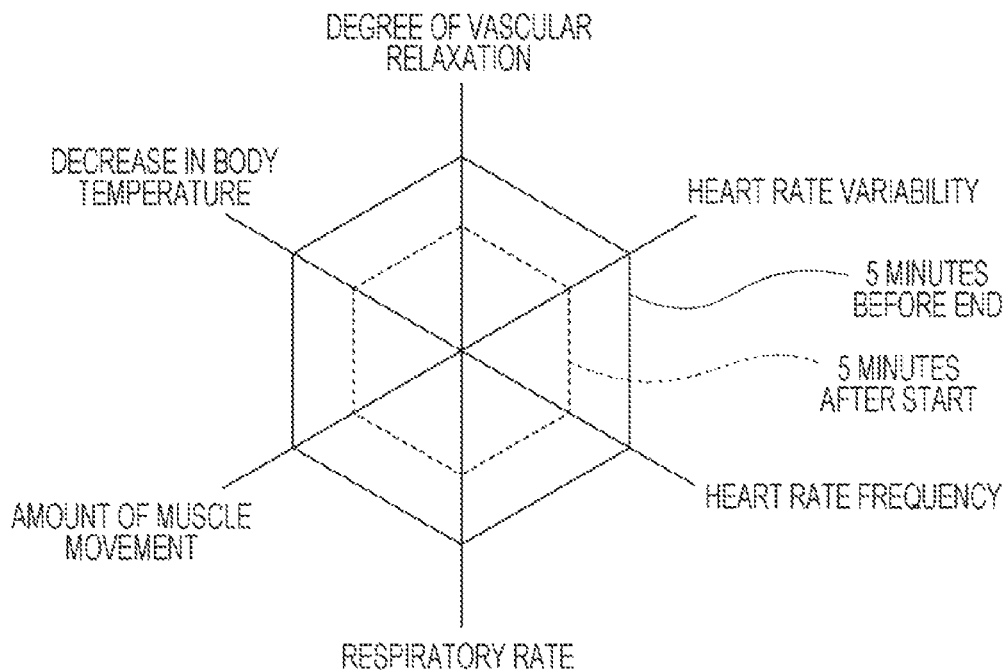
FIG. 6 is a diagram illustrating an example notification of the evaluation values.
Figure 7:
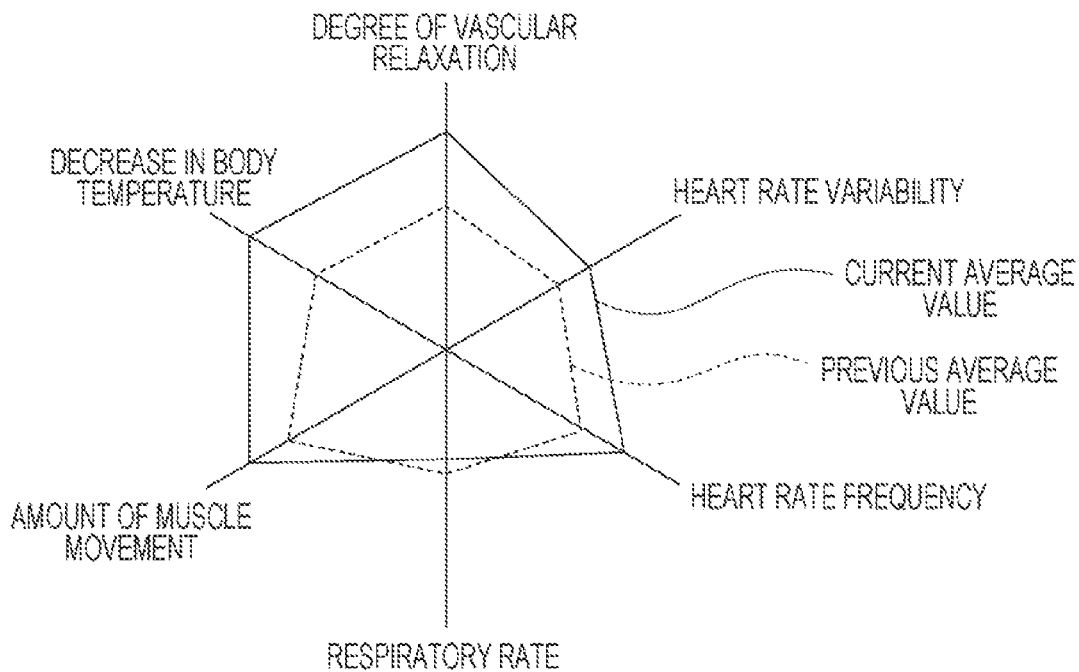
FIG. 7 is a diagram illustrating an example notification of the evaluation values.
Figure 8:
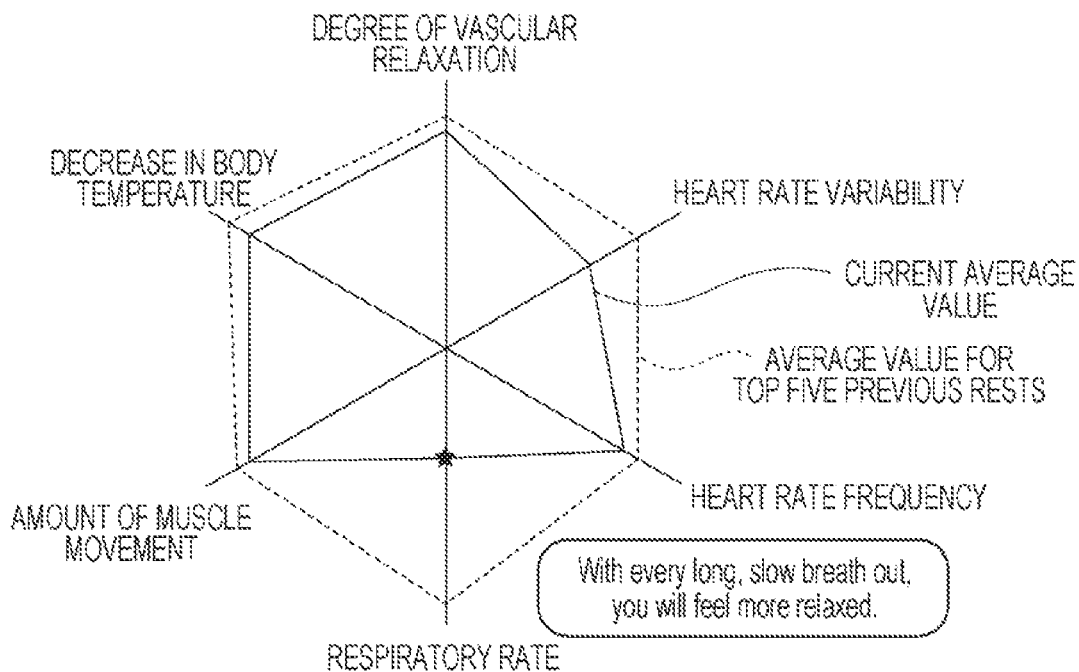
FIG. 8 is a diagram illustrating an example notification of the evaluation values.

FIGS. 6 to 8 are diagrams illustrating example notifications of the evaluation values. The notification controller 23 causes the display 12 to display one or more of the radar charts illustrated in FIGS. 6 to 8.

For example, as illustrated in FIG. 6, the notification controller 23 plots average evaluation values over a predetermined start period such as 5 minutes after the start of the rest time and average evaluation values over a predetermined end period such as 5 minutes before the end of the rest time on the same radar chart and displays the radar chart on the display 12.

In FIG. 6, the average evaluation values over 5 minutes after the start of the rest time are indicated by a broken line, and the average evaluation values over 5 minutes before the end of the rest time are indicated by a solid line.

As a result, the notification controller 23 can notify the user of the degree to which the user is relaxed during a period of time from immediately after the start to immediately before the end of the current rest.

As illustrated in FIG. 7, the notification controller 23 plots average evaluation values for the current rest and average evaluation values for the previous rest on the same radar chart and displays the radar chart on the display 12.

The average evaluation values for the current rest are each an average of evaluation values obtained in the current rest evaluation process. The average evaluation values for the previous rest are each an average of evaluation values obtained during all the previous rests (rest evaluation process). In FIG. 7, the average evaluation values for the current rest are indicated by a solid line, and the average evaluation values for the previous rest are indicated by a broken line.

As a result, the notification controller 23 can notify, for each evaluation item, the user of whether the current rest is a better quality rest than the previous rests.

As illustrated in FIG. 8, the notification controller 23 plots average evaluation values for the current rest and average evaluation values for top five previous rests on the same radar chart and displays the radar chart on the display 12. The top five previous rests are rests having the top five highest average evaluation values among the previous rests.

In FIG. 8, the average evaluation values for the current rest are indicated by a solid line, and the average evaluation values for the top five previous rests are indicated by a broken line.

As a result, the notification controller 23 can present the degree to which the user is relaxed during the current rest, that is, the degree of the quality of the current rest, compared to the top five previous rests.

The notification controller 23 further notifies the user of advice based on the comparison result. For example, the notification controller 23 displays advice to improve an evaluation item for which the evaluation value is equal to or less than a certain percentage of the average evaluation value for the top five previous rests.

For example, as illustrated in FIG. 8, when the evaluation value for the respiratory rate is low, advice such as "With every long, slow breath out, you will feel more relaxed" is displayed.

Figure 9:
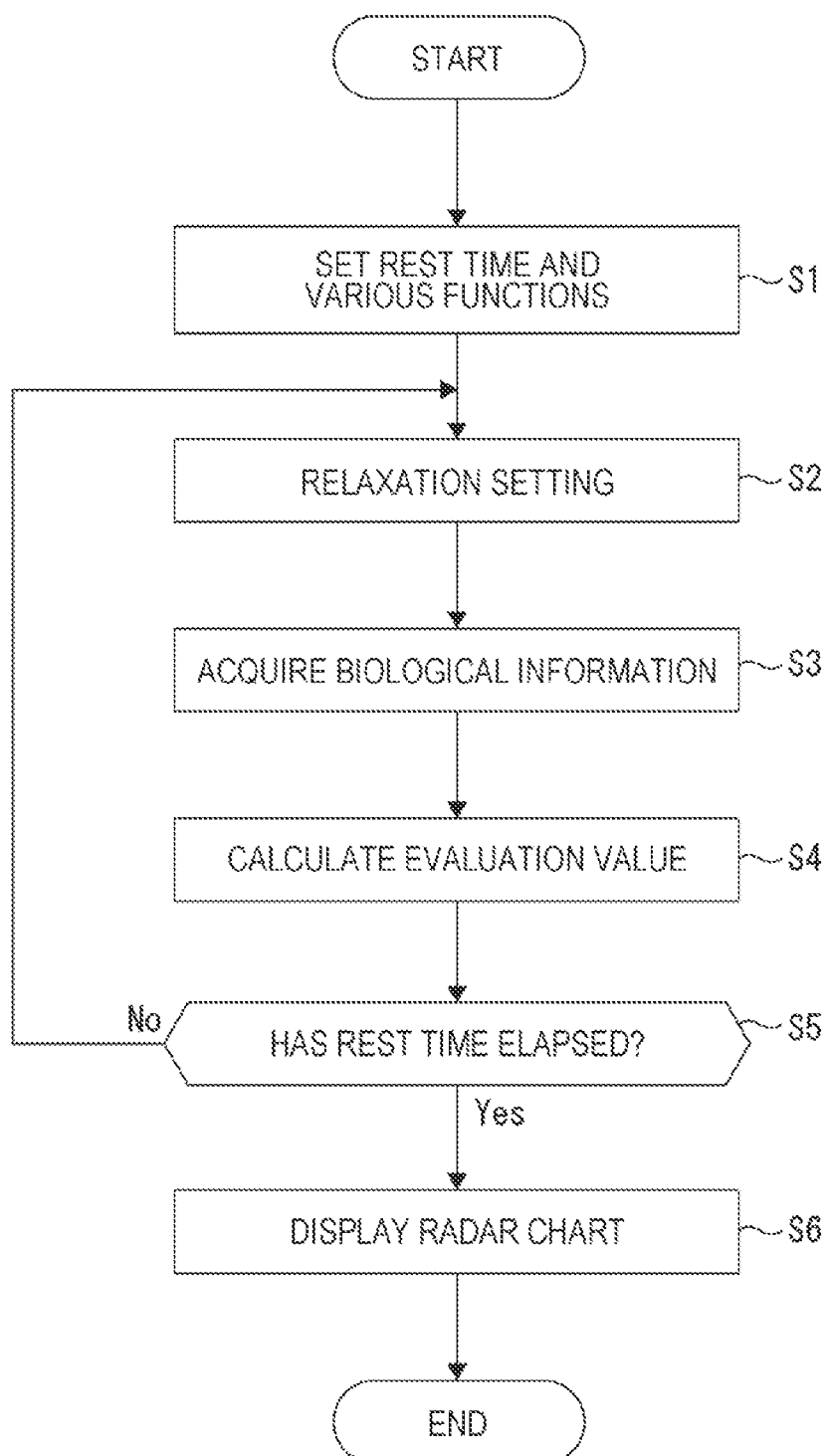
FIG. 9 is a flowchart illustrating the flow of a rest evaluation process.

FIG. 9 is a flowchart illustrating the flow of the rest evaluation process. As illustrated in FIG. 9, when a predetermined start condition is satisfied and the rest evaluation process is started, then, in step S1, the controller 11 sets a rest time and various functions.

Subsequently, in step S2, the controller 11 performs relaxation setting for improving the quality of rest. In step S3, the biological information acquirer 21 acquires an image captured by the in-vehicle camera 18 and acquires biological information based on the acquired image. Thereafter, in step S4, the evaluation value calculator 22 multiplies the acquired biological information by a predetermined coefficient to calculate an evaluation value for each evaluation item.

Thereafter, in step S5, the controller 11 determines whether the rest time has elapsed. Then, the controller 11 repeatedly performs the processing of steps S2 to S4 until the rest time ends.

On the other hand, when the rest time has elapsed (Yes in step S5), to display one or more of the radar charts illustrated in FIGS. 6 to 8 on the display 12, the notification controller 23 calculates an average evaluation value for each evaluation item to be displayed on the radar chart, and displays, on the display 12, the radar chart on which the calculated average evaluation values for the respective evaluation items are plotted. Further, the controller 11 stores the evaluation value for each evaluation item during the current rest in the storage 19 in association with, for example, the date and time of the rest.

While an embodiment of the disclosure has been described, the disclosure is not limited to the specific examples described above, and various configurations may be adopted.

For example, in the embodiment described above, the vehicle 1 is an electric vehicle or a hybrid vehicle including the motor 2 as a power source. However, the vehicle 1 may be an automobile including an engine as a power source.

In the embodiment described above, the three radar charts have been described, for example, but not by way of limitation, to compare evaluation values and notify the user of a comparison result. Any other tool may be used to compare evaluation values and notify the user of a comparison result.

For example, instead of a radar chart, a line graph or a bar graph may be used to compare evaluation values and notify the user of a comparison result.

In the embodiment described above, furthermore, comparisons are made between 5 minutes after the start of the rest time and 5 minutes before the end of the rest, between the current rest and the previous rest, and between the current rest and the top five previous rests, and the comparison results are notified to the user. However, the comparison targets for evaluation values are not limited thereto.

For example, an average value of evaluation values over a predetermined period of rest in the past, an average value of evaluation values in the preceding rest, or the like may be used as a comparison target.

In the embodiment described above, the controller 11 performs the relaxation setting in the rest evaluation process. However, the relaxation setting may be performed by the user.

As described above, the vehicle rest evaluation device 10 according to an embodiment includes a computer (the controller 11). The computer includes the biological information acquirer 21 configured to acquire biological information of a user who rests in the vehicle 1, the evaluation value calculator 22 configured to calculate, based on the biological information, an evaluation value for evaluating the balance of the autonomic nervous system of the user, and the notification controller 23 configured to make a comparison between the evaluation value calculated by the evaluation value calculator 22 and an evaluation value calculated at a different timing and notify the user of a result of the comparison.

With this configuration, the vehicle rest evaluation device 10 can allow the user to compare and check the quality of rest in the current rest.

Accordingly, the user can grasp the quality of the current rest by comparing an evaluation value for the current rest with an evaluation value at a different timing. In addition, the user can examine the influence of the conditions for the current rest, such as the settings of various functions and the rest time, on the quality of rest. By examining the conditions for the current rest, the user can take a better quality rest.

Therefore, the vehicle rest evaluation device 10 can improve the quality of rest taken by the user who rests in the vehicle 1.

Further, the user can take a rest like playing a game and is willing to take a rest. Thus, the vehicle rest evaluation device 10 can promote safety in driving.

Further, the notification controller 23 makes a comparison between an evaluation value over a predetermined start period after the start of a single rest and an evaluation value over a predetermined end period before the end of the single rest and notify the user of a result of the comparison.

With this configuration, the vehicle rest evaluation device 10 can allow the user to compare and check an evaluation value immediately after the start of the current rest and an evaluation value immediately before the end of the current rest, thereby allowing the user to check the degree to which the user is relaxed.

Further, the notification controller 23 makes a comparison between an evaluation value for a current rest and an evaluation value for a previous rest and notify the user of a result of the comparison.

With this configuration, the vehicle rest evaluation device 10 can allow the user to check, through a comparison, the degree of quality of rest in the current rest, compared to the previous rest.

Further, the notification controller 23 makes a comparison between an evaluation value for a current rest and a high evaluation value for a previous rest and notify the user of a result of the comparison.

With this configuration, the vehicle rest evaluation device 10 can allow the user to check which evaluation item and how much the score for the current rest is increased or decreased compared to scores for previous rests.

The notification controller 23 further notifies the user of advice based on the result of the comparison.

With this configuration, by notifying the user of advice based on the result of the comparison, the vehicle rest evaluation device 10 can improve the quality of rest taken by the user.

According to an embodiment of the disclosure, the quality of rest taken in a vehicle can be improved.

The controller 11 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 11 including the biological information acquirer 21, the evaluation value calculator 22, and the notification controller 23. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle rest evaluation device for a vehicle, the vehicle rest evaluation device comprising a computer, the computer comprising:
   a biological information acquirer configured to acquire biological information of a user who rests in the vehicle during a rest period comprising either a battery charging period or a break period during long-term driving;
   an evaluation value calculator configured to calculate, based on the biological information, a first evaluation value for multiple evaluation items and a second evaluation value for the multiple evaluation items for evaluating a balance of an autonomic nervous system of the user; and
   a notification controller configured to make a comparison between the first evaluation value calculated by the evaluation value calculator at a first timing and the second evaluation value calculated by the evaluation value calculator at a second timing different from the first timing, and to notify the user of a result of the comparison, wherein the result of the comparison enables the user to evaluate rest quality and improve future rest periods.

2. The vehicle rest evaluation device according to claim 1, wherein the notification controller is configured to
   make the comparison between the first evaluation value over a predetermined start period after a start of a single rest and the second evaluation value over a predetermined end period before an end of the single rest to notify the user of the result of the comparison.

3. The vehicle rest evaluation device according to claim 1, wherein the notification controller is configured to
   make the comparison between the first evaluation value for a current rest and the second evaluation value for a previous rest to notify the user of the result of the comparison.

4. The vehicle rest evaluation device according to claim 1, wherein the notification controller is configured to
   make the comparison between the first evaluation value for a current rest and the second evaluation value including a top evaluation value for a previous rest to notify the user of the result of the comparison.

5. The vehicle rest evaluation device according to claim 4, wherein the notification controller is configured to
   notify the user of advice based on the result of the comparison.

6. The vehicle rest evaluation device according to claim 5, wherein the notification controller is configured to display advice to improve an evaluation item for which an evaluation value of the evaluation item is equal to or less than a certain percentage of an average evaluation value for previous rests.

7. The vehicle rest evaluation device according to claim 1, wherein the rest period comprises a battery charging period of 30 to 60 minutes.

8. The vehicle rest evaluation device according to claim 1, wherein the notification controller is configured to display a radar chart for comparing rest quality metrics.

9. The vehicle rest evaluation device according to claim 1, further comprising a controller configured to perform relaxation settings during the rest period, the relaxation settings including reclining a driver's seat, displaying a preset image, outputting a preset sound, or controlling a temperature to make the user feel comfortable based on the biological information.

10. The vehicle rest evaluation device according to claim 1, wherein the biological information acquirer is configured to perform image processing on an image captured by an in-vehicle camera to detect face color for measuring vascular relaxation.

11. A vehicle rest evaluation device for a vehicle, the vehicle rest evaluation device comprising:

circuitry configured to acquire biological information of a user who rests in the vehicle during a rest period comprising either a battery charging period or a break period during long-term driving, calculate, based on the biological information, an evaluation value and another evaluation value, a first evaluation value for multiple evaluation items and a second evaluation value for the multiple evaluation items for evaluating a balance of an autonomic nervous system of the user, make a comparison between the first evaluation value calculated by the evaluation value calculator at a first timing and the second evaluation value calculated by the evaluation value calculator at a second timing different from the first timing, and notify the user of a result of the comparison, wherein the result of the comparison enables the user to evaluate rest quality and improve future rest periods.

12. The vehicle rest evaluation device according to claim 11, wherein the rest period comprises a battery charging period of 30 to 60 minutes.

13. The vehicle rest evaluation device according to claim 11, wherein the circuitry is configured to display a radar chart for comparing rest quality metrics.

14. The vehicle rest evaluation device according to claim 11, wherein the circuitry is configured to perform relaxation settings during the rest period, the relaxation settings comprising reclining a driver's seat, displaying a preset image, outputting a preset sound, or controlling a temperature to make the user feel comfortable based on the biological information.

15. The vehicle rest evaluation device according to claim 11, wherein the circuitry is configured to perform image processing on an image captured by an in-vehicle camera to detect face color for measuring vascular relaxation.

16. The vehicle rest evaluation device according to claim 11, wherein the circuitry is configured to (i) notify the user of advice based on the result of the comparison and (ii) display advice to improve an evaluation item for which an evaluation value of the evaluation item is equal to or less than a certain percentage of an average evaluation value for previous rests.

* * * * *